US012784573B2

(12) United States Patent
Lim et al.

(10) Patent No.: US 12,784,573 B2
(45) Date of Patent: Nov. 3, 2026

(54) METHODS, SYSTEMS, AND DEVICES FOR PROVIDING TIP INFORMATION WITH AN EMERGENCY NOTIFICATION

(71) Applicant: MOTOROLA SOLUTIONS, INC., Chicago, IL (US)

(72) Inventors: Bing Qin Lim, Bayan Lepas (MY); Heetat Goey, Sungai Petani (MY); Ming Yeh Koh, Bdr Baru Air Itam (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 210 days.

(21) Appl. No.: 18/926,422

(22) Filed: Oct. 25, 2024

(65) Prior Publication Data

US 2026/0120555 A1 Apr. 30, 2026

(51) Int. Cl.
*G08B 27/00* (2006.01)
*G06F 21/62* (2013.01)
*G10L 15/22* (2006.01)

(52) U.S. Cl.
CPC ....... *G08B 27/006* (2013.01); *G06F 21/6254* (2013.01); *G10L 15/22* (2013.01)

(58) Field of Classification Search
CPC .... G08B 27/006; G06F 21/6254; G10L 15/22
See application file for complete search history.

(56) References Cited

U.S. PATENT DOCUMENTS 11,259,166 B1 2/2022 Lim et al.
11,388,287 B2 7/2022 Poikselka et al.
11,995,733 B2 5/2024 Levert et al.

*Primary Examiner* — Nader Bolourchi

(57) ABSTRACT

Aspects of the subject disclosure may include, for example, receiving first user-generated input from a first communication device associated with a user, the first user-generated input comprises first tip information associated with a complaint, receiving second user-generated input from a second communication device associated with the user, the second user-generated input indicates an emergency, and receiving third user-generated input from the second communication device. Further embodiments can include determining that the emergency is related to the first tip information based on the third user-generated input resulting in a first determination, and based on the first determination, providing a notification to each communication device of a first group of communication devices, the notification indicates the emergency, the notification includes the first tip information, and each communication device of the first group of communication devices is associated with security personnel. Other embodiments are disclosed.

20 Claims, 10 Drawing Sheets

100

130

140

150

160

170

180

200

300

METHODS, SYSTEMS, AND DEVICES FOR PROVIDING TIP INFORMATION WITH AN EMERGENCY NOTIFICATION

FIELD OF THE DISCLOSURE

The subject disclosure relates to methods, systems, and devices for providing tip information with an emergency notification.

BACKGROUND

In the current state of the art, there are aspects of notifying security personnel (e.g., law enforcement personnel, building security personnel, campus security personnel, etc.) of a complaint (e.g., crime, noise complaint, etc.) that can include providing security personnel tip information regarding the complaint. For example, a witness to a crime (e.g., stealing of a bicycle from a neighbor's yard) can record evidence (e.g., capture a video) and submit the recorded evidence as part of the tip information to security personnel. In other aspects of the current state of the art, a witness or victim of a crime can notify security personnel of an ongoing crime. Further, there can be instances when a perpetrator of the crime may threaten a witness who has submitted recorded evidence of the crime, and the witness may notify security personnel of an emergency associated with the threat.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
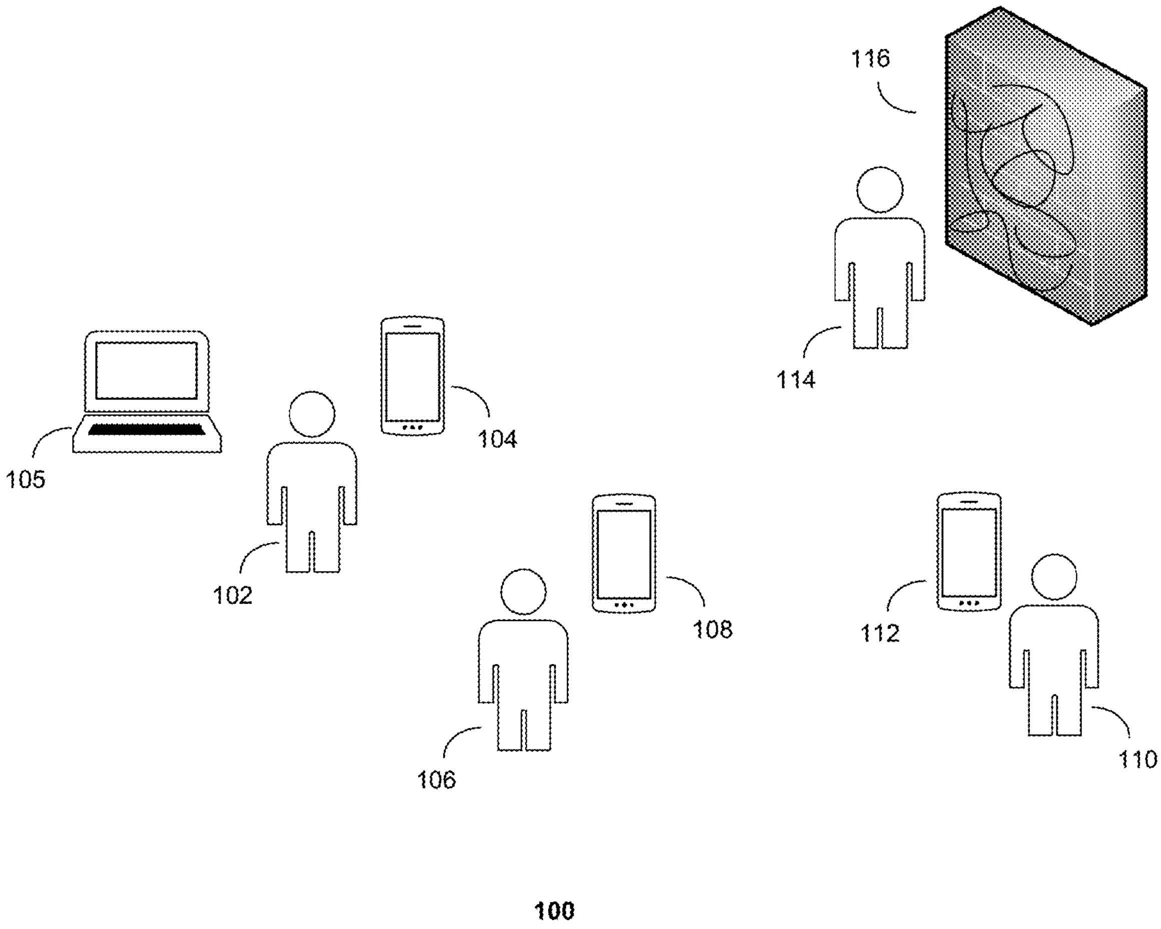
FIGS. 1A-1H are block diagrams illustrating example, non-limiting embodiments of a system functioning in various aspects described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The subject disclosure describes, among other things, illustrative embodiments for receiving, by a processing system including a processor, over a communication network, first user-generated input from a first communication device associated with a user. The first user-generated input comprises first tip information associated with a complaint. Further embodiments can include receiving, by the processing system, over the communication network, second user-generated input from a second communication device associated with the user, the second user-generated input indicates an emergency, and receiving, by the processing system, over the communication network, third user-generated input from the second communication device. Further embodiments can include determining, by the processing system, that the emergency is related to the first tip information based on the third user-generated input resulting in a first determination, and based on the first determination, providing, by the processing system, a notification to each communication device of a first group of communication devices. The notification indicates the emergency, and the notification includes the first tip information. Each communication device of the first group of communication devices is associated with security personnel. Other embodiments are described in the subject disclosure.

Further, the subject disclosure describes, among other things, illustrative embodiments of a device, comprising a processing system including a processor, and a memory that stores executable instructions that, when executed by the processing system, facilitate performance of operations. The operations can comprise receiving, over a communication network, first user-generated input from a first communication device associated with a user, the first user-generated input comprises tip information associated with a complaint, and receiving, over the communication network, second user-generated input from a second communication device associated with the user, the second user-generated input indicates an emergency. Further operations can comprise receiving, over the communication network, third user-generated input from the second communication device, determining that the emergency is related to the tip information based on the third user-generated input resulting in a first determination, and based on the first determination, providing a notification to each communication device of a first group of communication devices, the notification indicates the emergency, and the notification includes the tip information. Each communication device of the first group of communication devices is associated with security personnel.

In addition, the subject disclosure describes, among other things, illustrative embodiments of a non-transitory machine-readable medium, comprising executable instructions that, when executed by a processing system including a processor, facilitate performance of operations. The operations can comprise receiving, over a communication network, first user-generated input from a first communication device associated with a user, the first user-generated input comprises tip information associated with a complaint, and receiving, over the communication network, second user-generated input from a second communication device associated with the user, the second user-generated input indicates an emergency. Further operations can comprise receiving, over the communication network, third user-generated input from the second communication device, determining that the emergency is related to the tip information based on the third user-generated input resulting in a first determination, and based on the first determination, providing a notification to each communication device of a first group of communication devices, the notification indicates the emergency, and the notification includes the tip information. Each communication device of the first group of communication devices is associated with security personnel.

One or more embodiments can include a user of a mobile public safety application witnessing a crime and recording a picture or a video of the crime. Further, the user may submit the picture or video of the crime to law enforcement via the mobile public safety application as part of providing tip information about the witnessed crime. However, the perpetrator of the crime may notice the witnessing and recording of the crime. At a later time, the perpetrator may come across the user and threaten the user with imminent harm such that the user submits an emergency notification to law enforcement via the mobile public safety application. In addition, the mobile public safety application can provide the user with a feature to prompt the user to relate the emergency notification with a previously submitted tip. Subsequently, a server communicatively coupled to the mobile public safety application can receive the emergency notification as well as the indication that the emergency notification is related to previously submitted tip. Further, the server can provide a notification to a group of communication devices, each of which are associated with law enforcement personnel. The notification not only includes the nature of the emergency, but also provides the tip information previously submitted to assist law enforcement personnel to mitigate the emergency (e.g., apprehend the perpetrator based on identification of the perpetrator provided in, and/or determined by the tip information)

FIGS. 1A-1H are block diagrams illustrating example, non-limiting embodiments of a system functioning in various aspects described herein. Referring to FIG. 1A, in one or more embodiments, system 100 can include user 102 associated with communication device 104 and communication device 105, user 106 associated with communication device 108, and user 110 associated with communication device 112. Each of communication device 104, communication device 105, communication device 108, and communication device 112 can be running a mobile public safety application. Further, system 100 can include a perpetrator 114 vandalizing a wall 116 of a building (e.g., crime). Each of user 102, user 106, and user 110 can record evidence (e.g., capturing an image, recording video, etc.) associated with the crime of perpetrator 114 vandalizing wall 116 utilizing the mobile public safety application on respective communication device 104, communication device 108, and communication device 112. Further, each of user 102, user 106, and user 110 can submit the recorded evidence (e.g., captured image, recorded video, etc.) as part of tip information in notifying of a crime to law enforcement personnel utilizing the mobile public safety application on respective communication device 104, communication device 108, and communication device 112. In some embodiments, user 102 can record the evidence utilizing the mobile public safety application on communication device 104 but can later submit the evidence as part of tip information of notifying the crime utilizing the mobile public safety application on communication device 105. However, each of communication device 104 and the communication device 105 is associated with a same user account associated with user 102. Each of communication device 104, communication device 105, communication device 108, and communication device 112 can comprise, but not limited to, a mobile phone, a smartphone, a mobile device, a table computer, a laptop computer, a desktop computer, or any other communication device.

Figure 1B:
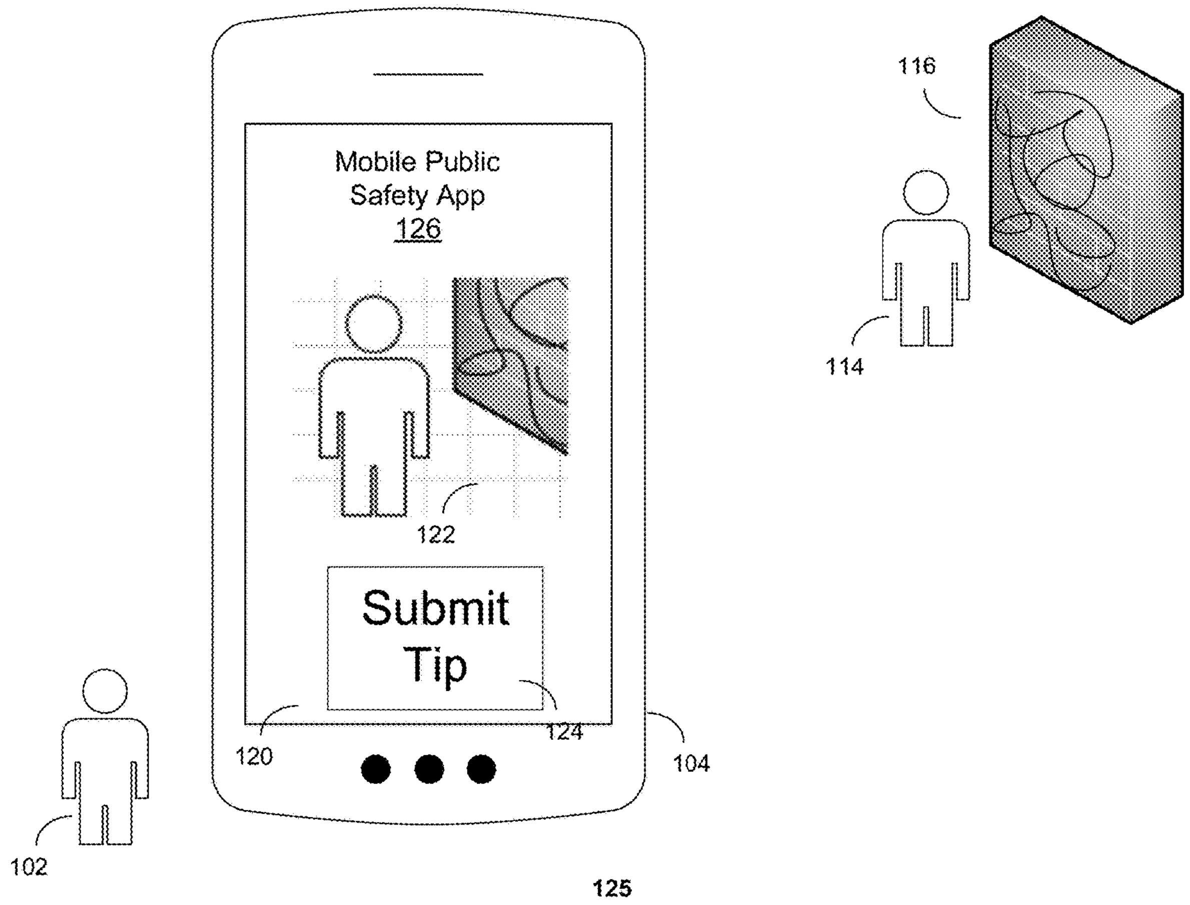

Referring to FIG. 1B, in one or more embodiments, system 125 shows user 102 can record evidence 122 (e.g., capture an image, video, etc.) of perpetrator 114 vandalizing wall 116 utilizing a user interface 120 of the mobile public safety application 126 running on communication device 104. Further, user interface 120 can include a touch screen button 124 that can be clicked to submit the recorded evidence 122 as a part of tip information to law enforcement personnel.

Figure 1C:
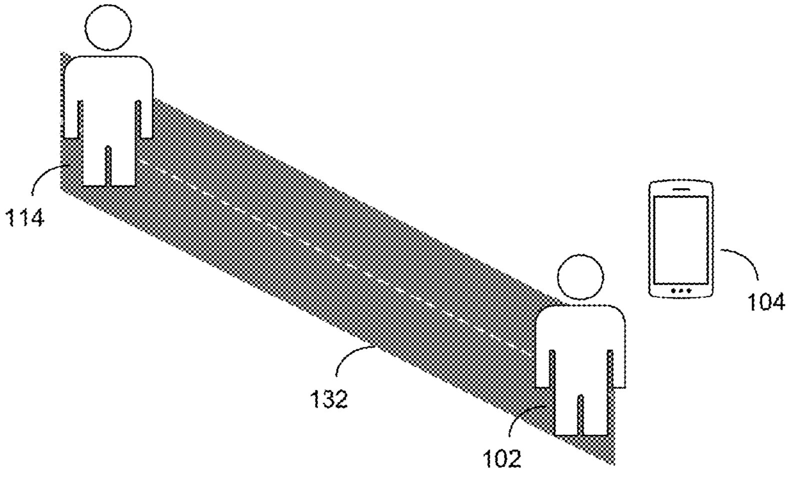

Referring to FIG. 1C, in one or more embodiments, system 130 can show perpetrator 114 randomly coming across user 102 with communication device 104 on a sidewalk 132 at a later time after the user 102 submitted tip information regarding a crime committed by perpetrator 114. On the sidewalk 132, perpetrator 114 can recognize user 102 as a witness that recorded evidence of a crime they committed previously. Further, the perpetrator may threaten user 102 with harm for recording evidence of the crime.

Figure 1D:
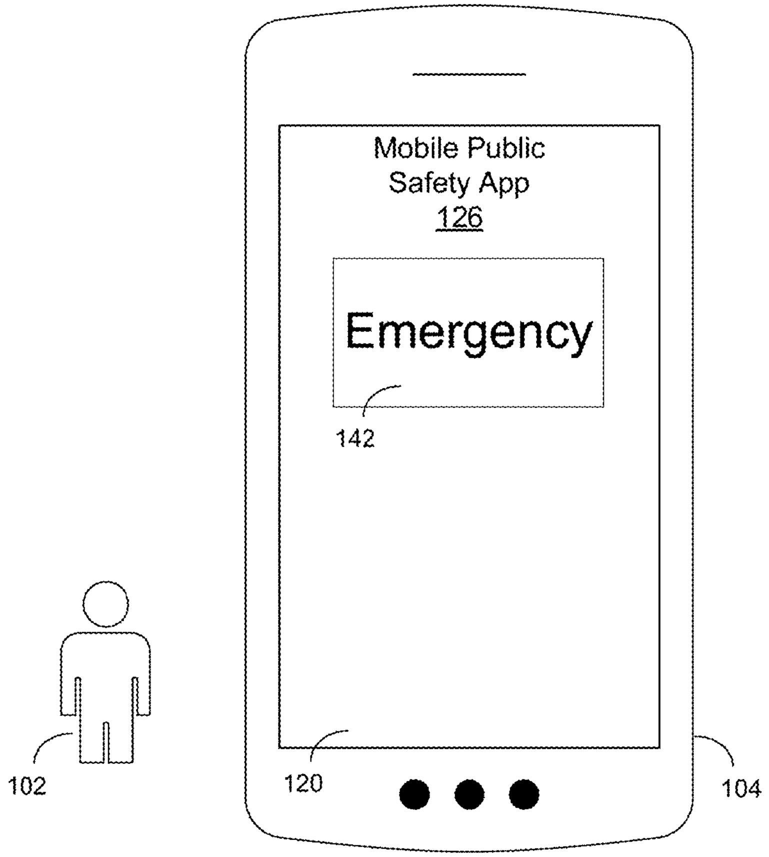

Referring to FIG. 1D, in one or more embodiments, system 140 can illustrate user 102 submitting an emergency notification utilizing the mobile public safety application 126 running on communication device 104 in response to receiving a threat of harm by a perpetrator of a crime. Submitting the emergency notification can include clicking a touchscreen button 142 on user interface 120 of the mobile public safety application 126.

Figure 1E:
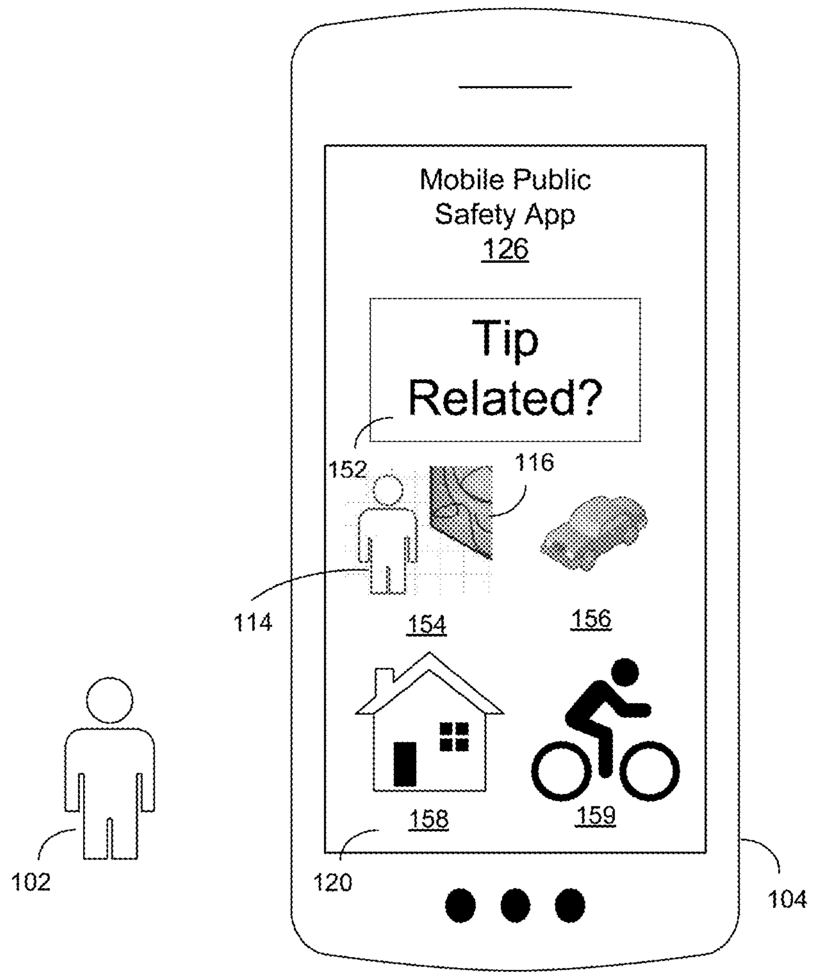

Referring to FIG. 1E, in one or more embodiments, system 150 can illustrate the user interface 120 of mobile public safety application 126 running on communication device 104 prompting user 102 whether the emergency is related to tip information previously submitted by user 102. This prompt can include a clickable button 152 on the user interface 120 that includes a prompt asking whether the emergency is related to a previously related tip. Further, user interface 120 can present thumbnail images of previously submitted tips by user 102 recorded and submitted by the mobile public safety application 126. The thumbnail image can be a snippet of the recorded evidence associated with each previously submitted tip. For example, thumbnail image 154 is associated with perpetrator 114 vandalizing wall 116, thumbnail image 156 is associated with car theft, thumbnail image 158 is associated with stealing packages in front of a house, and thumbnail image 159 is associated with stealing of a bicycle. In some embodiments, a user 102 can touch or click the thumbnail image (e.g., thumbnail image 154) presented on user interface 120 to submit that the emergency is related to the tip associated with thumbnail image 154. In one example, only the thumbnail image (e.g., snippet) of the most recently submitted tip is presented to the user 102 due to the probability that the most recently submitted tip is likely the most relevant to the emergency.

Figure 1F:
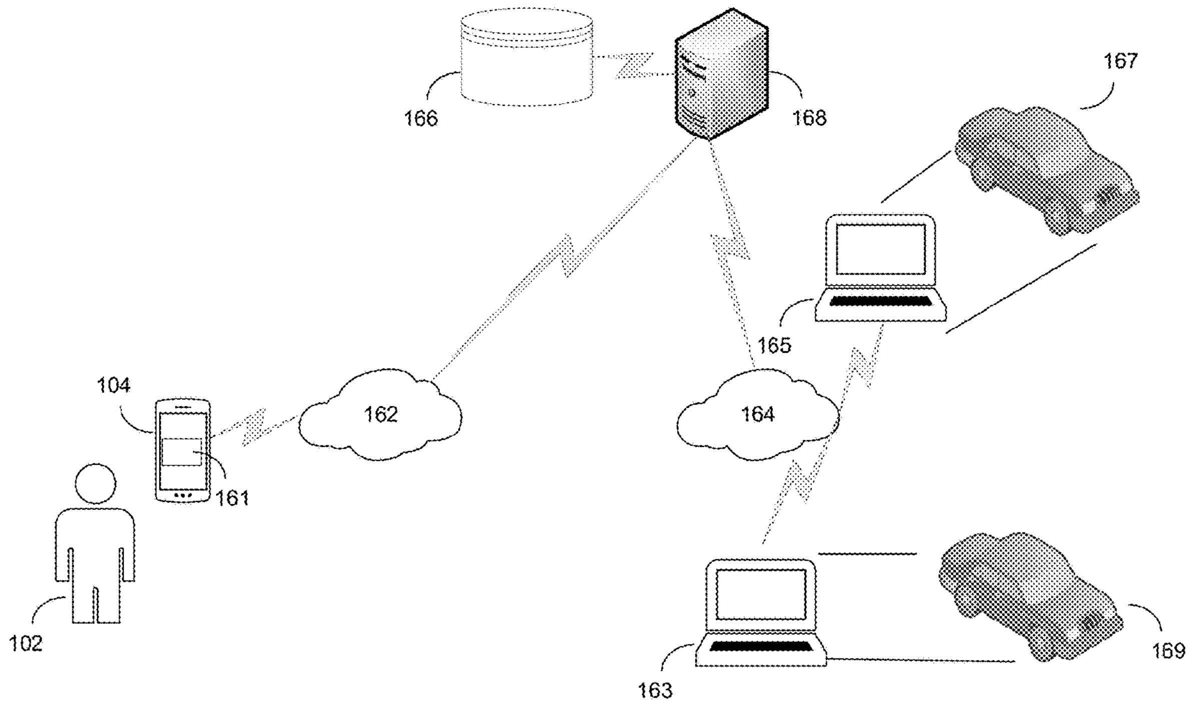

Referring to FIG. 1F, in one or more embodiments, system 160 can include communication device 104 associated with user 102. Further, server 168 can be communicatively coupled to communication device 104 over communication network 162, and communicatively coupled to database 166. In addition, server 168 can be communicatively coupled to each of communication device 163 and communication device 165 over communication network 164. Each of communication device 163 and communication device 165 can be a communication device associated with law enforcement personnel. Also, communication device 163 can be located within or otherwise associated with law enforcement vehicle 169 and communication device 165 can be located within or otherwise associated with law enforcement vehicle 167.

In one or more embodiments, server 168 can comprise one or more servers residing one location or spanning multiple locations, one or more virtual servers residing in one location or spanning multiple locations, one or more cloud servers, or a combination thereof. Further, database 166 can comprise one or more databases residing in one location or spanning multiple locations. Each of communication device 163 and communication device 165 can comprise, but is not limited to, a mobile phone, a smartphone, a mobile device, a table computer, a laptop computer, a desktop computer, or any other communication device. In addition, each of communication network 162 and communication network 164 can comprise one or more wireless communication networks, one or more wired communication networks, or combination thereof. In some embodiments, communication network 162 can comprise a mobile network such as a Long Term Evolution (LTE) mobile network or a 5G mobile network and communication network 164 can comprise a land mobile radio network or a public safety/first responder's communication network.

In one or more embodiments, server 168 can receive tip information (e.g., image 161) associated with a crime (e.g., perpetrator vandalizing wall) from communication device 104 associated with a user 102 utilizing a mobile public safety application over communication network 162. The server 168 can anonymize the tip information, for example, removing personal identifiable information (PII) associated with user 102 from the tip information. This can not only include the name, address, and phone number of the user 102, but also the identifier associated with communication device 104 (e.g., subscriber identity module (SIM) ID, International Mobile Equipment Identity (IMEI), etc.). Further, the server 168 can generate a tip identifier associated with the tip information and store the tip information in database 166 and associate the tip identifier with the tip information in database 166, accordingly. Also, the server 168 can provide the tip identifier to communication device 104. The mobile public safety application on communication device 104 can associate the tip identifier with the tip information. In some embodiments, the mobile public safety application can generate a thumbnail image associated with the tip information and associate the tip identifier with the thumbnail image.

In one or more embodiments, server 168 can receive over communication network 162 an emergency notification submitted by user 102 from communication device 104 utilizing the mobile public safety application. Moreover, the server 168 can receive further user-generated input submitted by user 102 from communication device 104 utilizing the mobile public safety application over communication network 162. The user-generated input can comprise or otherwise indicate the tip identifier associated with the previously submitted tip information. That is, in some embodiments, the user-generated input can comprise of user 102 touching/clicking a thumbnail image associated with the tip information on the user interface of the mobile public safety application, which causes the communication device 104 to provide the tip identifier to be delivered from communication device 104 to server 168 over communication network 162.

In one or more embodiments, because server 168 receives the emergency notification and the user-generated input indicating the tip identifier within the same communication session with communication device 104, the server 168 determines that the emergency is related to the tip information. In response, the server 168 can access the tip information from database 166 according to the tip identifier. Further, the server 168 can provide a notification (e.g., Be On the Lookout (BOLO) notification) to each of communication device 163 and communication device 165. The notification can indicate the emergency and include the tip information. In some embodiments, prior to providing the notification, the server 168 can un-anonymize the tip information, which can include all or part of the associated PII previously removed and was associated with the tip information. Also, un-anonymizing the tip information can comprise associating the tip information with user 102. In one example, the PII associated with user 102 is retrieved from the user profile of the mobile public safety application stored in communication device 104.

Figure 1G:
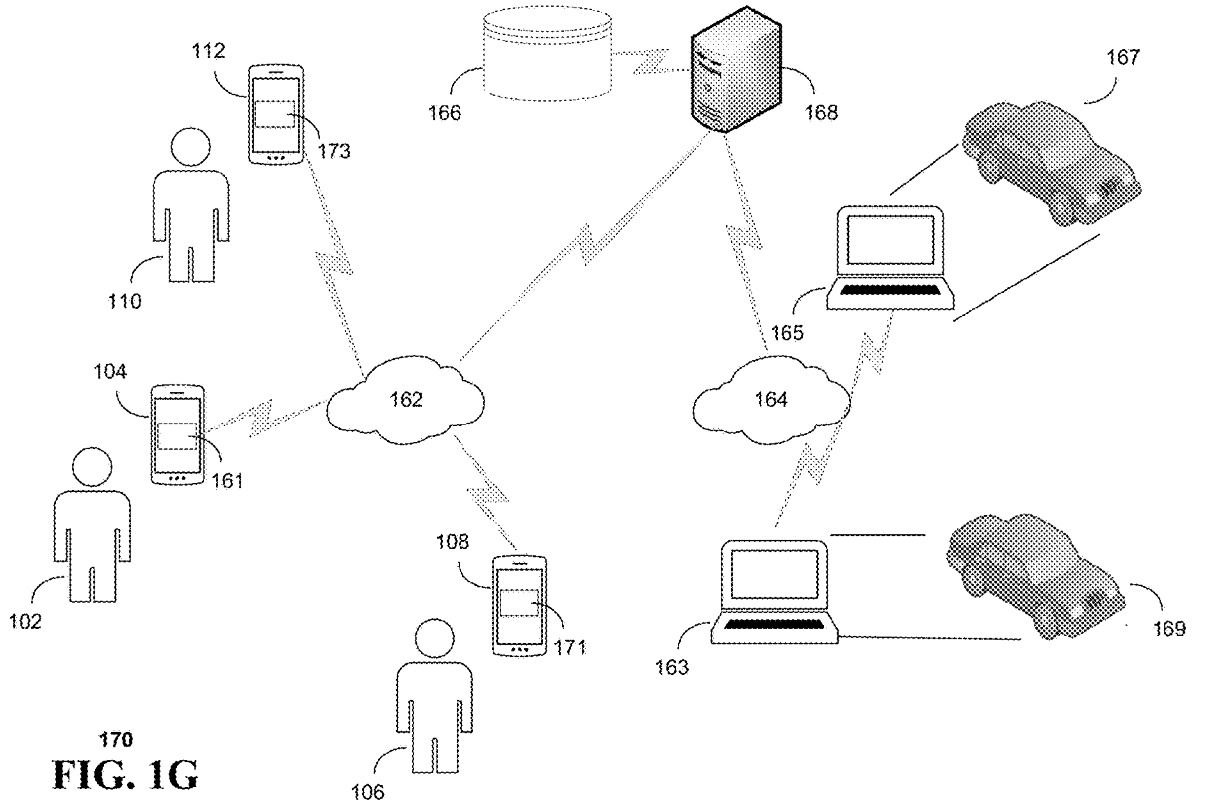

Referring to FIG. 1G, in one or more embodiments, system 170 includes aspects of system 160 of FIG. 1F as well as additional aspects of the disclosure. System 170 can include communication device 108 associated with user 106 communicatively coupled to server 168 over communication network 162 and communication device 112 associated with user 110 communicatively coupled to server 168 over communication network 162. Further, system 170 can show that while a perpetrator was committing a crime (e.g., vandalizing wall) , not only did user 102 witness and record evidence (e.g., capturing an image 161) of the crime, but also user 106 witnessed and recorded evidence (e.g., capturing an image 171) of the crime. Also, user 110 witnessed and recorded evidence (e.g., capturing an image 173) of the crime. In addition to receiving tip information (e.g., image 161) from communication device 104 over communication network 162, server 168 can receive tip information (e.g., image 171) over communication network 162 from communication device 108 submitted by user 106 utilizing a respective mobile public safety application and server 168 can receive tip information (e.g., image 173) over communication network 162 from communication device 112 submitted by user 110 utilizing a respective mobile public safety application. In addition, the server 168 can determine a location of communication device 104, communication device 108, and communication device 112 utilizing the respective mobile public safety application (e.g., each respective mobile public safety application can access the location of its respective communication device). Also, the server 168 can determine the subject matter of tip information submitted by user 102, user 106, and user 110. Determination of subject matter can include utilizing image recognition techniques on the recorded evidence submitted by each user 102, user 106, and user 110. Further, server 168 can determine the subject matter included in recorded evidence submitted by each user are related based on image recognition of the recorded evidence. That is, image recognition determines that the recorded evidence/tip information submitted from each of user 102, user 106, and user 110 are of the same crime. Further, the server 168 can store the tip information submitted by user 102, user 106, and user 110 into database 166. In addition, the server 168 can associate each tip information submitted by user 102, user 106, and user 110 with the same tip identifier. Thus, when user 102 submits the emergency notification related to their previously submitted tip information, the notification regarding the emergency provided to communication device 163 and communication device 165 associated with law enforcement personnel over communication network 164 (communication device 163 can be associated with law enforcement vehicle 169 and communication device 165 can be associated with law enforcement vehicle 167) not only includes the tip information submitted by user 102, but also the tip information provided by user 106 and user 110. In such embodiments, law enforcement personnel receive more robust information regarding the perpetrator 114 (e.g., receiving different angles of face of the perpetrator 114 to correctly identify them accordingly) to apprehend the perpetrator. In one example, three thumbnail images with respective snippets of tip information submitted by user 102, user 106, and user 110 can be displayed to the user who triggered the emergency to select which tips are associated with the emergency.

In one or more embodiments, user 102 can submit the emergency notification and its related tip information utilizing voice recognition. That is, user 102 may be accosted by perpetrator 114 such that user 102 is subject to imminent physical harm. User 102 may not have the capacity in such a situation to use their hands to click buttons on the user interface of the mobile public safety application. Instead, the mobile public safety application can include a panic button to utilize a voice recognition feature that allows user 102 to submit the emergency and relate the emergency to previously submitted tip information. For example, user 102 can say "EMERGENCY! The guy who vandalized the wall yesterday is chasing me!" The mobile public safety application can utilize voice recognition to determine the date and subject matter of the tip information and provide such information to server 168. Based on the date and subject matter as well as the identity or identifier associated with user 102 and/or communication device 104, server 168 can determine the tip identifier of the tip information and access the tip information from database 166, accordingly, to include in the notification to communication device 163 and communication device 165 associated with law enforcement personnel.

Figure 1H:
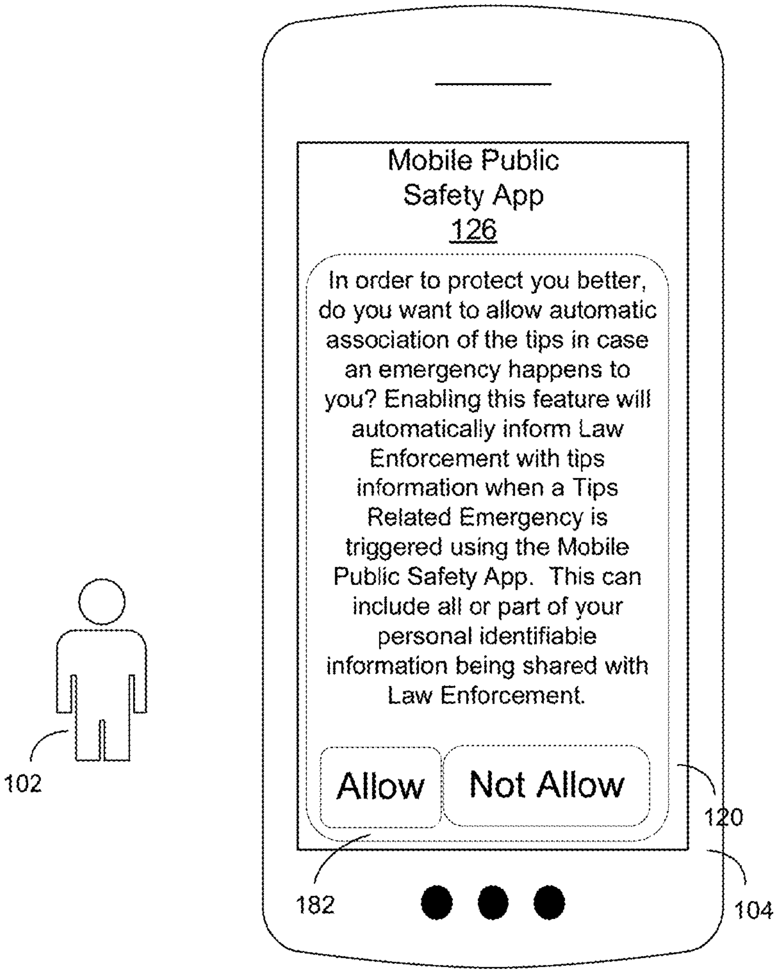

Referring to FIG. 1H, in one or more embodiments, system 180 can include communication device 104 associated with user 102 running mobile public safety application 126. Further, the user interface 120 of the mobile public safety application 126 presents to user 102 the consequences of selecting to have tip information related to an emergency notification and allowing user 102 to acknowledge the consequences accordingly. In some embodiments, when a user (e.g., user 102) indicates that they would like to utilize the tip submit feature of mobile public safety application 126, a consensus message/link 182 is presented on the user interface 120 of communication device 104 to the user 102. The consensus message/link 182 indicates the consequences of allowing tip information being related to a future emergency notification. Specifically, the consensus message/link 182, when accepted by user 102, indicates that previously submitted tip information can be provided to law enforcement personnel when indicated to be related to any future emergency notification. Further, by clicking the "allow" button associated with the consensus message/link, user 102 acknowledges that all or part of their PII can be shared with law enforcement when their tip information is distributed to law enforcement in a future emergency notification.

Figure 2:
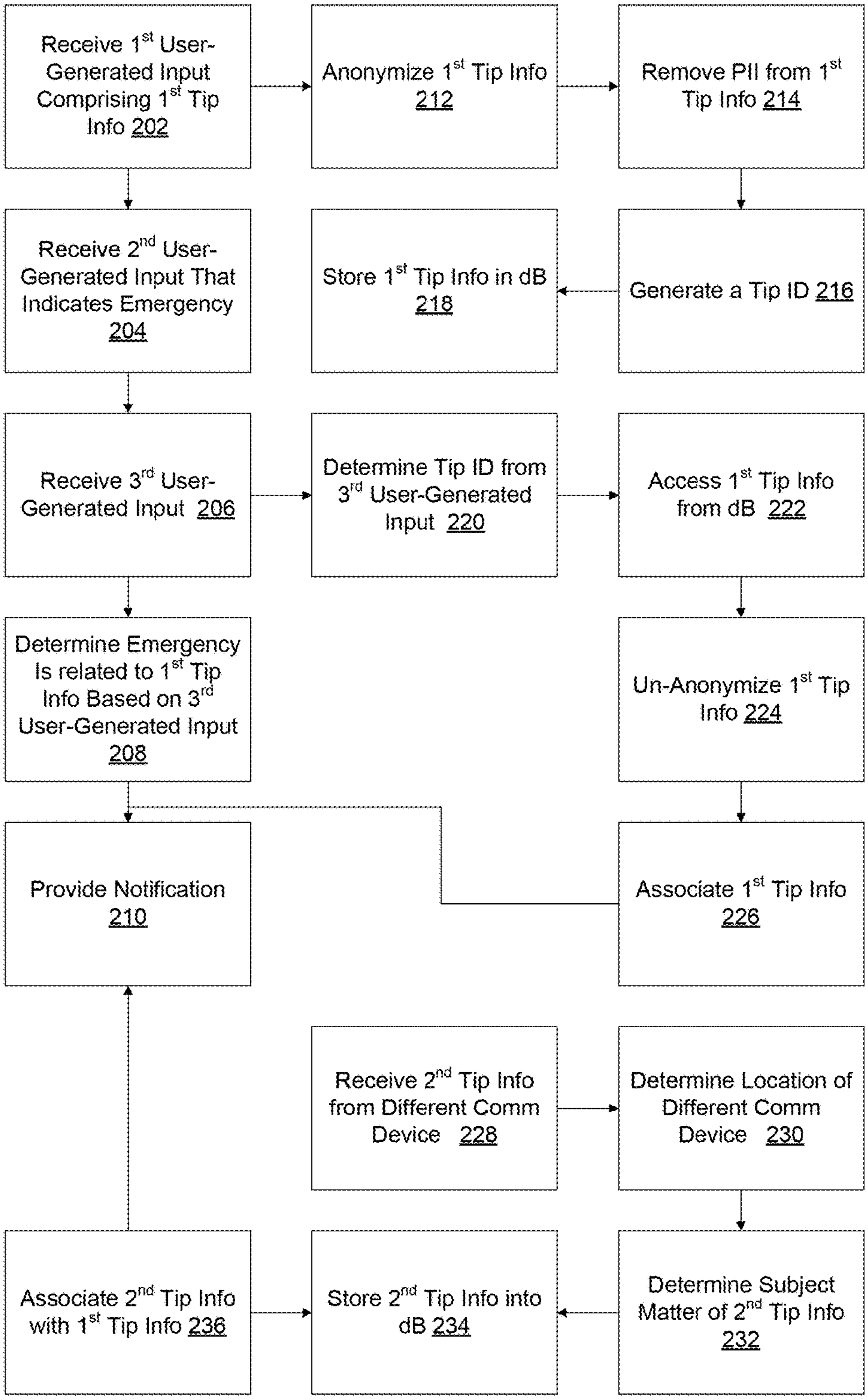
FIG. 2 depicts an illustrative embodiment of a flowchart of a method in accordance with various aspects described herein.

FIG. 2 depicts an illustrative embodiment of a flowchart of method 200 in accordance with various aspects described herein. In one or more embodiments, aspects of method 200 can be performed by a server (e.g., server 168 of FIG. 1F and FIG. 1G). The method 200 can include the server, at 202, receiving over a communication network, first user-generated input from a first communication device associated with a user. The first user-generated input comprises first tip information associated with a complaint. A complaint can include, but is not limited to, a crime, violation, noise complaint, yard maintenance complaint, etc. Further, the method 200 can include the server, at 204, receiving over the communication network, second user-generated input from a second communication device associated with the user. The second user-generated input indicates an emergency. In addition, the method 200 can include the server, at 206, receiving over the communication network, third user-generated input from the second communication device. Also, the method 200 can include the server, at 208, determining that the emergency is related to the first tip information based on the third user-generated input resulting in a first determination. Further, the method 200 can include the server, at 210, based on the first determination, providing a notification to each communication device of a first group of communication devices. The notification indicates the emergency and the notification includes the first tip information. Each communication device of the first group of communication devices is associated with security personnel. Security personnel can include, but is not limited to, law enforcement personnel, building security personnel, campus security personnel, etc.

In one or more embodiments, the method 200 can include the server, at 212, anonymizing the first tip information. Further, the method 200 can include the server, at 214, removing PII from the first tip information associated with the user as part of the anonymizing of the first tip information. In addition, the method 200 can include the server, at 216, generating a tip identifier associated with the first tip information. Also, the method 200 can include the server, at 218, storing the first tip information in a database according to the tip identifier.

In one or more embodiments, the method 200 can include the server, at 220, in response to receiving the third user-generated input, determining the tip identifier from the third user-generated input. In some embodiments, the third user-generated input comprises the tip identifier. In other embodiments, the third user-generated input can comprise a date, location, and/or subject matter associated with the first tip information and the server can determine the tip identifier from the date, location, and/or subject matter. Further, the method 200 can include the server, at 222, accessing the first tip information from the database according to the tip identifier. In addition, the method 200 can include the server, at 224, un-anonymizing the first tip information. Also, the method 200 can include the server, at 226, associating the first tip information with the user. The un-anonymizing and/or associating of the first tip information can comprise integrating all or part of the PII previously removed from the first tip information to assist law enforcement personnel in mitigating the emergency. For example, the PII now included in the first tip information can comprise the user's physical address. The emergency notification submitted by the user may indicate that the perpetrator is threatening the user at the user's residence. If the first tip information includes the user's physical address and is provided to law enforcement personnel accordingly, then law enforcement personnel can attempt to apprehend the perpetrator or otherwise mitigate the emergency at the user's residence.

In one or more embodiments, the method 200 can include the server, at 228, receiving over the communication network, second tip information from a different communication device. That is, a second user may have submitted the second tip information for the same complaint as associated with the first tip information from the different communication device. Further, the method 200 can include the server, at 230, determining a location of the different communication device. In addition, the method 200 can include the server, at 232, determining a subject matter associated with the second tip information resulting in a second determination. Also, the method 200 can include the server, at 234, storing the second tip information into the database. Further, the method 200 can include the server, at 236, based on the location and the second determination, associating the second tip information with the first tip information in the database according to the tip identifier. When the notification to each of communication device associated with security personnel is provided, the notification can indicate or include the second tip information. This allows security personnel to have more robust information regarding the perpetrator to mitigate the emergency, (e.g. arrest the perpetrator, etc.).

In one or more embodiments, the first tip information includes an image associated with the complaint. Further, the second communication device displays the image, the second communication device generates the third user-generated input by the user clicking on the image. In addition, the second communication device associates the first tip information with the third user-generated input in response to the user clicking the image. In some embodiments, the first communication device and the second communication device can be the same communication device. In other embodiments, in which the first communication device and the second communication device are separate communication devices, each of the first communication device and the second communication device is associated with the same user account. In further embodiments, the second communication device generates the third user-generated input utilizing voice recognition, as described herein.

While for purposes of simplicity of explanation, the respective processes are shown and described as a series of blocks in FIG. 2, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. One or more blocks can be performed in response to one or more other blocks.

Portions of some embodiments can be combined with portions of other embodiments.

Figure 3:
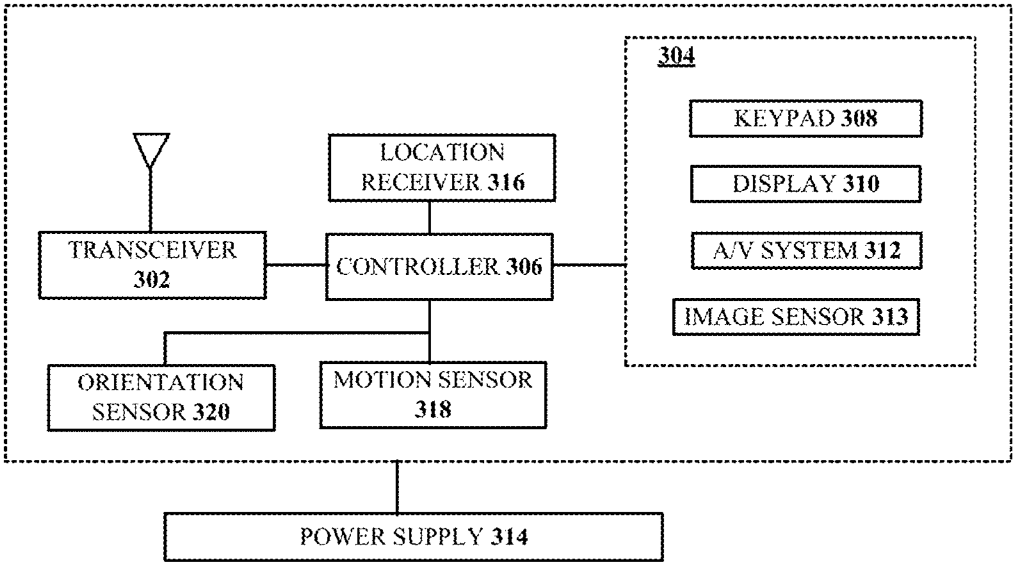
FIG. 3 is a block diagram of an example, non-limiting embodiment of a communication device in accordance with various aspects described herein.

FIG. 3 is a block diagram of an example, non-limiting embodiment of a communication device in accordance with various aspects described herein. The communication device 300 can serve as an illustrative embodiment of devices described herein. For example, communication device 300 can facilitate in whole or in part submitting related tip information when submitting an emergency notification. Each of communication device 104, communication device 105, communication device 108, communication device 112, database 166, server 168, communication device 163, and communication device 163 can comprise aspects of communication device 300.

The communication device 300 can comprise a wireline and/or wireless transceiver 302 (herein transceiver 302), a user interface (UI) 304, a power supply 314, a location receiver 316, a motion sensor 318, an orientation sensor 320, and a controller 306 for managing operations thereof. The transceiver 302 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 302 can also be adapted to support circuit-switched wireline access technologies (such as PSTN), packet-switched wireline access technologies (such as TCP/IP, VoIP, etc.), and combinations thereof.

The UI 304 can include a depressible or touch-sensitive keypad 308 with a navigation mechanism such as a roller ball, a joystick, a mouse, or a navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth®. The keypad 308 can represent a numeric keypad commonly used by phones, and/or a QWERTY keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display 310 with navigation features.

The display 310 can use touch screen technology to also serve as a user interface for detecting user input. As a touch screen display, the communication device 300 can be adapted to present a user interface having graphical user interface (GUI) elements that can be selected by a user with a touch of a finger. The display 310 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 310 can be an integral part of the housing assembly of the communication device 300 or an independent device communicatively coupled thereto by a tethered wireline interface (such as a cable) or a wireless interface.

The UI 304 can also include an audio system 312 that utilizes audio technology for conveying low volume audio (such as audio heard in proximity of a human ear) and high-volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and/or charging system technologies for supplying energy to the components of the communication device 300 to facilitate long-range or short-range portable communications. Alternatively, or in combination, the charging system can utilize external power sources such as DC power supplied over a physical interface such as a USB port or other suitable tethering technologies.

The location receiver 316 can utilize location technology such as a global positioning system (GPS) receiver capable of assisted GPS for identifying a location of the communication device 300 based on signals generated by a constellation of GPS satellites, which can be used for facilitating location services such as navigation. The motion sensor 318 can utilize motion sensing technology such as an accelerometer, a gyroscope, or other suitable motion sensing technology to detect motion of the communication device 300 in three-dimensional space. The orientation sensor 320 can utilize orientation sensing technology such as a magnetometer to detect the orientation of the communication device 300 (north, south, west, and east, as well as combined orientations in degrees, minutes, or other suitable orientation metrics).

The communication device 300 can use the transceiver 302 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 306 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 300.

Other components not shown in FIG. 3 can be used in one or more embodiments of the subject disclosure. For instance, the communication device 300 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method, comprising:

receiving, by a processing system including a processor, over a communication network, first user-generated input from a first communication device associated with a user, wherein the first user-generated input comprises first tip information associated with a complaint;

receiving, by the processing system, over the communication network, second user-generated input from a second communication device associated with the user, wherein the second user-generated input indicates an emergency;

receiving, by the processing system, over the communication network, third user-generated input from the second communication device;

determining, by the processing system, that the emergency is related to the first tip information based on the third user-generated input resulting in a first determination; and based on the first determination, providing, by the processing system, a notification to each communication device of a first group of communication devices, wherein the notification indicates the emergency, wherein the notification includes the first tip information, wherein each communication device of the first group of communication devices is associated with security personnel.

2. The method of claim 1, comprising:

in response to receiving the first user-generated input, anonymizing, by the processing system, the first tip information;

generating, by the processing system, a tip identifier associated with the first tip information; and storing, by the processing system, the first tip information in a database according to the tip identifier.

3. The method of claim 2, wherein the anonymizing of the first tip information comprises removing, by the processing system, personal identifiable information from the first tip information associated with the user.

4. The method of claim 2, comprising:

in response to receiving the third user-generated input, determining, by the processing system, the tip identifier from the third user-generated input;

accessing, by the processing system, the first tip information from the database according to the tip identifier; and un-anonymizing, by the processing system, the first tip information.

5. The method of claim 4, wherein un-anonymizing the first tip information comprises associating, by the processing system, the first tip information with the user.

6. The method of claim 2, comprising:

receiving, by the processing system, over the communication network, second tip information from a different communication device;

determining, by the processing system, a location of the different communication device;

determining, by the processing system, a subject matter associated with the second tip information resulting in a second determination;

storing, by the processing system, the second tip information into the database; and based on the location and the second determination, associating, by the processing system, the second tip information with the first tip information in the database according to the tip identifier.

7. The method of claim 6, wherein the notification indicates the second tip information.

8. The method of claim 2, wherein the third user-generated input comprises the tip identifier.

9. The method of claim 1, wherein the first tip information includes an image associated with the complaint.

10. The method of claim 9, wherein the second communication device displays the image, the second communication device generates the third user-generated input by the user clicking on the image.

11. The method of claim 10, wherein the second communication device associates the first tip information with the third user-generated input in response to the user clicking the image.

12. The method of claim 1, wherein the first communication device and the second communication device is a same communication device, wherein each of the first communication device and the second communication device is associated with a same user account.

13. The method of claim 1, wherein second communication device generates the third user-generated input utilizing voice recognition.

14. A device, comprising:

a processing system including a processor; and a memory that stores executable instructions that, when executed by the processing system, facilitate performance of operations, the operations comprising:

receiving, over a communication network, first user-generated input from a first communication device associated with a user, wherein the first user-generated input comprises tip information associated with a complaint;

receiving, over the communication network, second user-generated input from a second communication device associated with the user, wherein the second user-generated input indicates an emergency;

receiving, over the communication network, third user-generated input from the second communication device;

determining that the emergency is related to the tip information based on the third user-generated input resulting in a first determination; and based on the first determination, providing a notification to each communication device of a first group of communication devices, wherein the notification indicates the emergency, wherein the notification includes the tip information, wherein each communication device of the first group of communication devices is associated with security personnel.

15. The device of claim 14, wherein the operations comprise:

in response to receiving the first user-generated input, anonymizing the tip information;

generating a tip identifier associated with the tip information; and storing the tip information in a database according to the tip identifier.

16. The device of claim 15, wherein the anonymizing of the tip information comprises removing personal identifiable information from the tip information associated with the user.

17. The device of claim 15, wherein the operations comprise:

in response to receiving the third user-generated input, determining the tip identifier from the third user-generated input;

accessing the tip information from the database according to the tip identifier; and un-anonymizing the tip information.

18. The device of claim 17, wherein un-anonymizing the tip information comprises associating the tip information with the user.

19. The device of claim 14, wherein the first communication device and the second communication device is a same communication device, wherein each of the first communication device and the second communication device is associated with a same user account.

20. A non-transitory machine-readable medium, comprising executable instructions that, when executed by a processing system including a processor, facilitate performance of operations, the operations comprising:

receiving, over a communication network, first user-generated input from a first communication device associated with a user, wherein the first user-generated input comprises tip information associated with a complaint;

receiving, over the communication network, second user-generated input from a second communication device associated with the user, wherein the second user-generated input indicates an emergency;

receiving, over the communication network, third user-generated input from the second communication device;

determining that the emergency is related to the tip information based on the third user-generated input resulting in a first determination; and based on the first determination, providing a notification to each communication device of a first group of communication devices, wherein the notification indicates the emergency, wherein the notification includes the tip information, wherein each communication device of the first group of communication devices is associated with security personnel.

* * * * *